(12) United States Patent
Herzig

(10) Patent No.: US 8,114,950 B2
(45) Date of Patent: *Feb. 14, 2012

(54) WAX-LIKE β-KETOCARBONYL-FUNCTIONAL ORGANOSILICON COMPOUNDS

(75) Inventor: Christian Herzig, Waging (DE)

(73) Assignee: Wacker Chemie AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/933,282

(22) PCT Filed: Mar. 24, 2009

(86) PCT No.: PCT/EP2009/053415
§ 371 (c)(1),
(2), (4) Date: Sep. 17, 2010

(87) PCT Pub. No.: WO2009/121751
PCT Pub. Date: Oct. 8, 2009

(65) Prior Publication Data
US 2011/0024679 A1 Feb. 3, 2011

(30) Foreign Application Priority Data

Apr. 2, 2008 (DE) .......... 10 2008 000 931

(51) Int. Cl.
*C08G 77/00* (2006.01)
(52) U.S. Cl. ........... 528/10; 556/413; 523/109; 433/214
(58) Field of Classification Search ............ 528/10
See application file for complete search history.

(56) References Cited

U.S. PATENT DOCUMENTS

2003/0096919 A1  5/2003  Ichinohe
2008/0200584 A1* 8/2008  Bottcher et al. ............ 523/109
2008/0293907 A1* 11/2008 Herzig et al. ............... 528/10

FOREIGN PATENT DOCUMENTS

| DE | 10296506 T5 | 5/2007 |
|----|----|----|
| DE | 102005056051 A1 | 5/2007 |
| EP | 1624010 A1 | 2/2006 |
| WO | 2007060113 A2 | 5/2007 |

* cited by examiner

*Primary Examiner* — Randy Gulakowski
*Assistant Examiner* — Lindsay Nelson
(74) *Attorney, Agent, or Firm* — Brooks Kushman P.C.

(57) ABSTRACT

Long chain β-ketocarbonyl-functional organosilicon waxes are easily synthesized from organosilicon compounds bearing a reactive hydrogen bonded to N, O, or S, with a diketene. The products remain silicone-like despite being waxy, and can be used to gel low viscosity silicones to creamy formulations useful in cosmetics.

13 Claims, No Drawings

WAX-LIKE β-KETOCARBONYL-FUNCTIONAL ORGANOSILICON COMPOUNDS

CROSS-REFERENCE TO RELATED APPLICATION

This application is the U.S. national phase of PCT Appln. No. PCT/EP2009/053415 filed Mar. 24, 2009 which claims priority to German application DE 10 2008 000 931.8 filed Apr. 2, 2008.

BACKGROUND OF THE INVENTION

1. Field of the Invention

The invention relates to wax-like β-ketocarbonyl-functional organosilicon compounds, and to a process for their preparation.

2. Description of the Related Art

The standard preparation of silicone waxes is by hydrosilylation of hydrogensiloxane and alpha-olefins. The linear polymer thusly obtained consists predominantly of alkylmethylsiloxane units. On account of the required minimum chain length of the alkyl radicals, their fraction of the overall mass is very high, in most cases >70%, meaning that the silicone character is less marked. Moreover, the standard process has the inherent disadvantage of a hydrosilylation with residual content of SiH groups and the heavy metal content of the wax in the form of platinum compounds, which are required as catalysts.

DE 102 96 506 T5 describes linear silicone waxes which comprise at least 25 mol% of $RR^1SiO$ units, in which R is a $C_1$-$C_8$-alkyl radical or $C_6$-$C_{10}$-aryl radical, and $R^1$ corresponds to a long-chain organic radical having at least 16 carbon atoms and which may contain 1 to 10 heteroatoms. These waxes comprise a high percentage of long-chain organic radicals in the lateral position of the siloxane chain. Compared with siloxanes with a high fraction of dimethylsiloxane units, such polymers are complex and expensive to produce.

EP 1 624 010 A1 likewise describes linear silicone waxes which, apart from $C_1$-$C_{20}$-substituents, also contain substituents which consist of at least one behenic ester group bonded to the siloxane chain via a pentaerythritol radical. Although the molar amount can vary over a wide range, considerable expenditure is associated just with producing this large substituent. Finally, the aliphatically unsaturated behenic ester is bonded to the siloxane via hydrosilylation, as a result of which the silicone wax again contains heavy metal from platinum catalyst. Since the reaction components are not very soluble in one another, relatively large amounts of solvent are required to carry out the hydrosilylation. One production variant is based on the esterification of a behenic ester carbinol with anhydridosiloxane. In this variant, although no additional heavy metal compound is required, it is not possible to also dispense with solvents.

In a similar manner, according to US 2003/096919 A1, silicone waxes are prepared from an SiH—, SH— or amino-functional siloxane and a fatty acid or fatty alcohol component which additionally also contains an aliphatic double bond. A preferred fatty component is a behenic compound. The linear siloxanes are typically short-chain, and the organic fraction of the wax products is therefore in most cases considerably more than 50% by weight, as a result of which the siloxane character is not very marked.

WO 2007/060113 A2 describes a process for the preparation of β-ketocarbonyl-functional organosilicon compounds, in which diketenes are reacted with organosilicon compounds having amino groups. Here, oils are obtained.

SUMMARY OF THE INVENTION

It was an object to provide organosilicon compounds which are waxes but comprise only a small fraction of relatively long-chain alkyl radicals, and in which the silicone character is retained. A further object was to provide organosilicon compounds which are free from platinum compounds and residual amounts of SiH groups, with which no high-risk hydrogen evolution is possible. A still further object was to provide a process for the preparation of these organosilicon compounds which is simple and cost-effective and which proceeds spontaneously without a catalyst. These and other objects are achieved by the invention, where long chain-substituted β-ketocarbonyl groups are bonded to organosilicon compounds bearing a reactive hydrogen attached to —O—, —NH—, —$NR^2$—, or —S—.

DETAILED DESCRIPTION OF THE PREFERRED EMBODIMENTS

The invention thus provides wax-like β-ketocarbonyl-functional organosilicon compounds which comprise at least one Si-bonded radical B of the general formula

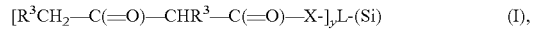

$$[R^3CH_2—C(=O)—CHR^3—C(=O)—X-]_y L-(Si) \qquad (I),$$

where
$R^3$ is a monovalent, optionally substituted hydrocarbon radical having at least 12 carbon atoms, preferably having at least 14 carbon atoms,
X is a radical of the formula —O—, —NH—, —$NR^2$— or —S—, preferably —NH—, where $R^2$ is a monovalent hydrocarbon radical having 1 to 18 carbon atoms, which may contain one or more separate nitrogen atoms,
L is a (y+1)-functional organic radical, preferably a divalent hydrocarbon radical having 1 to 18 carbon atoms,
y is 1, 2 or 3, preferably 1, and
(Si)— is the bond to the Si atom,
with the proviso that $R^3$ is present in an amount of at most 30% by weight, preferably at most 25% by weight, more preferably at most 20% by weight, yet more preferably at most 15% by weight, and in particular at most 10% by weight, in each case based on the total weight of the organosilicon compounds.

The invention further provides a process for the preparation of the wax-like β-ketocarbonyl-functional organosilicon compounds, in which organosilicon compounds (1) having at least one radical A of the general formula $$[HX-]_y L-(Si) \qquad (II)$$

are reacted with diketenes (2) of the general formula

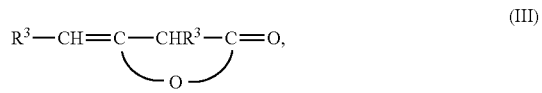

where $R^3$, L, X, y and (Si)— have the meaning given therefor above.

Organosilicon compounds (1) which can be used include silanes and oligomeric or polymeric organosiloxanes. They preferably contain 1 to 2000 Si atoms, more preferably 2 to 1000 Si atoms and most preferably 20 to 700 Si atoms.

Preferably, the organosilicon compounds (1) are organopolysiloxanes containing units of the general formula $$A_a R_b (OR^1)_c SiO_{\frac{4-(a+b+c)}{2}}, \quad (IV)$$

where
A is a radical of the formula (II),
R is a monovalent, optionally substituted hydrocarbon radical having 1 to 18 carbon atoms per radical,
$R^1$ is a hydrogen atom or an alkyl radical having 1 to 8 carbon atoms,
a is 0 or 1,
b is 0, 1, 2 or 3 and
c is 0 or 1,
with the proviso that the sum a+b+c is less than or equal to 3 and on average at least one radical A is present per molecule.

Preferred examples of organosilicon compounds (1) are organopolysiloxanes of the general formula $$A_g R_{3-g} SiO(SiR_2O)_l (SiRAO)_k SiR_{3-g} A_g \quad (V),$$

where
A is a radical of the formula (II),
g is 0 or 1, preferably 1,
l is 0 or an integer from 1 to 2000 and
k is 0 or an integer from 1 to 20, preferably 0,
with the proviso that on average at least one radical A is present per molecule.

The organosilicon compounds (1) used in the process according to the invention preferably have a viscosity of from 1 to 1,000,000 mPa·s at 25° C., more preferably 100 to 50,000 mPa·s at 25° C.

Examples of radicals R are alkyl radicals such as the methyl, ethyl, n-propyl, isopropyl, 1-n-butyl, 2-n-butyl, isobutyl, tert-butyl, n-pentyl, isopentyl, neo-pentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octa-decyl radical; cycloalkyl radicals such as the cyclo-pentyl, cyclohexyl, cycloheptyl and methylcyclohexyl radicals; alkenyl radicals such as the vinyl, 5-hexenyl, cyclohexenyl, 1-propenyl, allyl, 3-butenyl and 4-pentenyl radicals; alkynyl radicals such as the ethynyl, propargyl and 1-propynyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical and the α- and the β-phenylethyl radicals.

Examples of hydrocarbon radicals R also apply to hydrocarbon radicals $R^2$.

Further examples of $R^2$ are N-containing radicals such as —CH$_2$CH$_2$NH$_2$, —CH$_2$CH$_2$NHCH$_3$, —CH$_2$CH$_2$N(CH$_3$)$_2$, —CH$_2$CH$_2$CH$_2$NH$_2$, and —CH$_2$CH$_2$CH$_2$N(CH$_3$)$_2$.

Preferably, the radical $R^3$ has at most 18 carbon atoms, more preferably 14 to 16 carbon atoms. Radical $R^3$ is most preferably a $C_{14}$-$C_{16}$-alkyl radical.

Examples of radicals $R^3$ are the dodecyl, tetradecyl, hexadecyl and octadecyl radicals.

Examples of radicals L are
—CH$_2$CH$_2$—, —CH(CH$_3$)—, —CH$_2$CH$_2$CH$_2$—, —CH$_2$C(CH$_3$)H—,
—CH$_2$CH$_2$CH$_2$CH$_2$—, —CH$_2$CH$_2$CH(CH$_3$)—, and —CH$_2$CH$_2$CH$_2$NHCH$_2$CH$_2$—, —CH$_2$CH$_2$CH(CH$_3$)NHCH$_2$CH$_2$—, where the —CH$_2$CH$_2$CH$_2$— radical is preferred.

Examples of radicals A are
—CH$_2$CH$_2$CH$_2$OH,
—CH$_2$OCH$_2$CHOH,
—CH$_2$CH$_2$CH$_2$SH,
—CH$_2$CH$_2$CH$_2$NH$_2$.
—CH$_2$CH$_2$CH$_2$NHCH$_3$,
—CH$_2$CH(CH$_3$)NH$_2$.
—CH$_2$CH$_2$CH(CH$_3$)NH$_2$ and
—CH$_2$CH$_2$CH$_2$NHCH$_2$CH$_2$NH$_2$.

Organosilicon compounds (1) which contain primary amino groups are preferably reacted by the process described in WO 2007/060113 A2, in particular page 2, line 1 to page 3, line 1 and page 6, line 30 to page 9, line 8, incorporated herein by reference.

Preferably, therefore, organosilicon compounds (1) which contain primary amino groups as radical A are reacted with diketenes (2) in the presence of organic compounds (3) which delay or prevent the reaction of primary amino groups with β-ketocarbonyl compounds. Examples of such compounds (3) are aldehydes and ketones. Preferred examples are acetone, butanone, methyl isobutyl ketone and cyclohexanone. Preferably, the organosilicon compound (1) is firstly mixed with the organic compound (3) and then the diketene (2) is added.

Preferably, in a first stage, organosilicon compounds (1) are reacted with organic compounds (3), where the compounds (3) form protective groups on the amino groups in the radical A of the formula (II), and then, in a second stage, the organosilicon compounds (1) having the protected amino groups obtained in the first stage (reaction products of (1) and (3)) are reacted with diketenes (2). In the reaction with diketene, the protective group surprisingly cleaves off again from the amino group in the radical A of the formula (II).

If the organosilicon compounds (1) comprise only secondary amino groups in the radical A of the formula (II), they can be reacted directly with diketenes (2). If X is —O— in the radical A of the formula (II), tertiary amine bases are preferably used as catalysts, their concentration preferably being 50 to 1000 ppm by weight.

In the process according to the invention, diketene (2) is preferably used in amounts of 0.5 to 1.5 mol, preferably 0.7 to 1.2 mol, per mol of HX group in the radical A of the formula (II) of the organosilicon compound (1).

The diketenes (2) are solid substances at room temperature, meaning that their reaction with compounds (1) preferably takes place at elevated temperature, preferably at 50 to 100° C., so that the diketenes (2) are present in the molten state. Alternatively, it is also possible to use solvents, although this procedure is not preferred.

Preferably, the process according to the invention is carried out under the pressure of the ambient atmosphere, thus about at 1020 hPa. However, it can also be carried out at higher or lower pressures.

Wax-like β-ketocarbonyl-functional organosilicon compounds which can be obtained are silanes, oligomeric or polymeric organosiloxanes. They preferably contain 1 to 2000 Si atoms, more preferably 2 to 1000 Si atoms and most 20 to 700 Si atoms.

Preferably, the wax-like β-ketocarbonyl-functional organosilicon compounds obtained are organopoly-siloxanes consisting of units of the general formula $$B_d R_e (OR^1)_f SiO_{\frac{4-(d+e+f)}{2}}, \quad (VI)$$

where
B is a radical of the formula (I),
R is a monovalent, optionally substituted hydrocarbon radical having 1 to 18 carbon atoms per radical,
$R^1$ is a hydrogen atom or an alkyl radical having 1 to 8 carbon atoms,
d is 0 or 1,
e is 0, 1, 2 or 3 and
f is 0 or 1,
with the proviso that the sum d+e+f is less than or equal to 3 and on average at least one radical B is present per molecule.

Preferred examples of wax-like β-ketocarbonyl-functional organosilicon compounds are organopolysiloxanes of the general formula

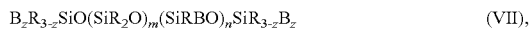   (VII), where
B is a radical of the formula (I),
z is 0 or 1, preferably 1,
m is 0 or an integer from 1 to 2000 and
n is 0 or an integer from 1 to 20, preferably 0,
with the proviso that on average at least one radical B is present per molecule.

In the β-ketocarbonyl-functional organopolysiloxanes according to the invention, $R^3$ is preferably present in an amount of at least 2% by weight.

The β-ketocarbonyl-functional organopolysiloxanes according to the invention have the advantage that, even with a low content of relatively long-chain alkyl chains, they are waxes and the silicone character is nevertheless retained.

This gives rise to the advantage that linear siloxanes with alkyl-β-ketoamide groups at the chain end even up to a polydimethylsiloxane fraction of more than 95% by weight still have wax-like solids consistency. Depending on the chain length of the siloxane, these waxes have a rather soft to very brittle character and can be produced easily and safely from the α,ω-amino-propyldimethylsiloxanes and standard commercial alkyl ketene dimer.

The melting range of the resulting β-ketocarbonyl-functional organosilicon compounds according to the invention is ca. 40-60° C., depending on the size of $R^3$. According to the preparation process, the waxes according to the invention are free from heavy metal and also free from SiH radicals and they have marked silicone character. They exhibit good solubility in liquid organopolysiloxanes, such as silicone oils, in contrast to the highly alkylated standard waxes.

The silicone waxes according to the invention have the advantage that with them a "gelling" of preferably volatile, linear or cyclic siloxanes is achieved. This is used in particular in cosmetics. The silicone waxes according to the invention are dissolved at elevated temperature in volatile linear or cyclic siloxanes. Upon cooling, creamy wax formulations, which are preferably soft and of firm consistency and which preferably consist to a large part of the volatile or thin-liquid linear or cyclic siloxanes, are obtained.

The invention therefore provides creamy wax formulations comprising
(a) wax-like β-ketocarbonyl-functional organosilicon compounds according to the invention and
(b) linear, branched or cyclic organosilicon compounds with a viscosity of 0.65 to 100,000 mPa·s at 25° C., preferably 0.65 to 500 mPa·s at 25° C.

Preferred (b) linear or cyclic organosilicon compounds are linear or cyclic organopolysiloxanes, such as hexamethylcyclotrisiloxane ($D_3$), octamethylcyclotetra-siloxane ($D_4$), decamethylcyclopentasiloxane ($D_5$), hexa-methyldisiloxane, octamethyltrisiloxane, decamethyl-tetrasiloxane or else relatively long polydimethyl-siloxanes, which do not have marked volatility, but do have good solubility in the silicone waxes according to the invention.

The creamy wax formulations preferably contain 20 to 95% by weight, more preferably 40 to 80% by weight, of the (b) linear or cyclic organosilicon compounds and thus preferably 5 to 80% by weight, more preferably 20 to 40% by weight, of the (a) silicone waxes according to the invention, the % by weight in each case referring to the total weight of the creamy wax formulations.

EXAMPLE 1

200 g of an aminopropyl-terminated polydimethylsiloxane with an amine equivalent weight of 1506 g/mol $NH_2$ are mixed with 15.4 g of acetone and stirred for 2.5 hours at 26° C. After heating to 54° C., 78 g of technical-grade alkyl ketene dimer, which has been prepared from a mixture of palmitic acid/stearic acid (ca. 30/70), thus providing a radical $R^3$ of $C_{14}/C_{16}$-alkyl, are added. The technical-grade product has a diketene content of 85%, such that a stoichiometry of 1.0:1.0 is established. After cooling to ca. 47° C., an exothermic reaction starts, which heats the reaction mixture by around 17° C. The alkyl ketene dimer is dissolved completely in the process, and the mixture clarifies. After one further hour at 64° C., the acetone is removed in vacuo and the clear molten wax is cooled. This gives 276 g of a brittle wax which has an amount of relatively long-chain $C_{14}/C_{16}$-alkyl radicals $R^3$ of 21% by weight. The alkyl ketene dimer conversion is more than 99% ($^1$H-NMR).

EXAMPLE 2

In accordance with Example 1, this time 200 g of an α,ω-aminopropylpolydimethylsiloxane with an amine equivalent weight of 5236 g/mol $NH_2$ are mixed with 4.4 g of acetone and stirred for 2.5 hours at 26° C. At 60° C., 22.5 g of the same alkyl ketene dimer as in Example 1 are added in a stoichiometric amount. With slightly exothermic reaction, the mixture becomes clear and, after a further hour at 67° C., the acetone is removed. With a detected alkyl ketene dimer conversion of ca. 99%, 220 g of a wax with a melting point of ca. 48° C., which has an amount of relatively long-chain $C_{14}/C_{16}$-alkyl radicals $R^3$ of 7.3% by weight, are obtained.

EXAMPLE 3

Using 300 g of an α,ω-aminopropylpolydimethylsiloxane (7519 g/mol $NH_2$) and 4.6 g of acetone, Example 2 is repeated but this time adding 23.5 g of the same alkyl ketene dimer in a stoichiometric ratio. Identical work-up gives 320 g of a silicone wax with a melting point of ca. 47° C., which has an amount of relatively long-chain $C_{14}/C_{16}$-alkyl radicals $R^3$ of 5.2% by weight.

The solubility of the silicone wax according to the invention in a silicone oil is investigated. For this, the amounts of silicone wax stated in the table are added to 100 g of dimethylpolysiloxane with trimethylsiloxane end groups and a viscosity of 35 mm²/s at 25° C. The results are summarized in the table.

EXAMPLE 4

The procedure of Example 3 is repeated except that the aminosiloxane is reacted with 27.0 g of a technical-grade alkyl ketene dimer, which corresponds to Example 1 but with the difference that its diketene content is only 75%. In a stoichiometric reaction, a quantitative conversion of the alkyl ketene dimer is also achieved again. Identical work-up gives 324 g of silicone wax with a melting point of ca. 45° C., which has an amount of relatively long-chain $C_{14}/C_{1-6}$-alkyl radicals $R^3$ of 5.2% by weight.

EXAMPLE 5

300 g of a long-chain α,ω-aminopropylpolydimethyl-siloxane with an amine equivalent weight of 15380 g/mol $NH_2$ (414 $Me_2SiO$ units) are stirred with 2.3 g of acetone for 2.5 hours at 26° C. The addition of 13.2 g of the 75% strength alkyl ketene dimer used in Example 4 at 60° C. produces only a slightly exothermic reaction over the course of 4 minutes. Postreaction for one hour and removal of the acetone in vacuo produces 310 g of silicone wax with a melting point of 45° C., which has an amount of relatively long-chain $C_{14}/C_{16}$-alkyl radicals $R^3$ of only 2.6% by weight.

Comparative Experiment 1

At 80° C., a total of 184.5 g of an α,ω-dihydrosiloxane with a content of Si-bonded hydrogen of 0.0542% by weight is metered into a solution of Karstedt catalyst (corresponding to 2.0 mg of platinum) in 30.3 g of 1-octadecene, and the mixture is left to postreact for one hour at 100° C. The IR spectrum confirms an SiH conversion of >99%. This gives a clear brownish liquid with a viscosity of 85 mm²/s at 25° C. The alkylsilicone comprises 12% by weight of Si-bonded octadecyl radicals, i.e. considerably more than in the products according to the invention of Examples 2 to 5 and is liquid despite the relatively long alkyl chain.

Comparative Experiment 2

The procedure of Comparative Experiment 1 is repeated except that this time 1-octadecene is reacted with 32.8 g of an α,ω-dihydrosiloxane with a content of Si-bonded hydrogen of 0.305% by weight. At a final concentration of 7 ppm of SiH, 99.6% conversion is reached. The slightly brownish liquid with a viscosity of 24 mm²/s at 25° C. comprises 44% by weight of Si-bonded octadecyl radicals, far more than the product according to the invention from Example 1, but is still liquid despite this high alkyl content.

Solubility of the Silicone Waxes in Silicone Oil

Example and Comparative Experiment 3

The solubility of the silicone wax according to the invention and of a standard silicone wax in a silicone oil is investigated. For this, the amounts of the silicone wax from Example 3 stated in the table are added at 50° C. to 100 g of dimethylpolysiloxane with trimethylsiloxane end groups and a viscosity of 35 mm²/s at 25° C.

In Comparative Experiment 3, a standard wax, an octadecylmethylsiloxane with trimethylsiloxane end groups (melting point of 43° C.), likewise in the amounts stated in the table, is added at 50° C. to 100 g of the same silicone oil, a dimethylpolysiloxane with dimethyl-siloxane end groups and a viscosity of 35 mm²/s at 25° C. The results are summarized in the table.

TABLE

Solubility of the silicone waxes in silicone oil

| Wax as in | Amount in 100 g of silicone oil | Solubility in silicone oil |
|---|---|---|
| Example 3 (wax according to the invention) | 0.5 g | Clear |
| | 1.5 g | Clear |
| | 15 g | Clear |
| | 35 g | Clear |
| Comparative Experiment 3 (standard wax) | 0.5 g | Clear |
| | 1.5 g | Cloudy |
| | 15 g | 2-phase |
| | 35 g | 2-phase |

Whereas the silicone wax according to the invention dissolves in silicone oil to give a clear solution, thus has retained its silicone character, the standard silicone wax as in Comparative Experiment 3 is no longer soluble in silicone oil, i.e. has lost its silicone character.

EXAMPLE 6

50 g of the silicone wax from Example 3 are dissolved at 60° C. in 150 g of decamethylcyclopentasiloxane ($D_5$). Upon cooling, a creamy-soft wax formulation of firm consistency, which consists of 75% by weight of the low viscosity $D_5$, is obtained.

Consequently, with the silicone wax according to the invention, a "gelling" of volatile cyclic siloxanes is achieved.

The invention claimed is:

1. A β-ketocarbonyl-functional organosilicon wax comprising at least one Si-bonded radical B of the formula $$[R^3CH_2\text{—}C(\text{=}O)\text{—}CHR^3\text{—}C(\text{=}O)\text{—}X\text{-}]_y L\text{-}(Si) \qquad (I),$$

where
$R^3$ is a monovalent, optionally substituted hydrocarbon radical having at least 12 carbon atoms,
X is a radical of the formula —O—, —NH—, —NR²— or —S—, where $R^2$ is a monovalent hydrocarbon radical having 1 to 18 carbon atoms, which may comprise one or more separate nitrogen atoms,
L is a (y+1)-functional organic radical,
y is 1, 2 or 3, and
(Si)— is the bond to an Si atom,
with the proviso that $R^3$ is present in an amount of at most 30% by weight, based on the total weight of the organosilicon wax.

2. The wax of claim 1, wherein $R^3$ is present in an amount of at most 25% by weight.

3. The wax of claim 1, wherein $R^3$ is present in an amount of at most 20% by weight.

4. The β-ketocarbonyl-functional organosilicon wax of claim 1, wherein X is a radical of the formula —NH—.

5. The β-ketocarbonyl-functional organosilicon wax of claim 1, wherein $R^3$ is present in an amount of at most 15% by weight, based on the total weight of the β-ketocarbonyl-functional organosilicon wax.

6. The β-ketocarbonyl-functional organosilicon wax of claim 1, which comprises an organopolysiloxane of the formula $$B_z R_{3-z} SiO(SiR_2 O)_m (SiRBO)_n SiR_{3-z} B_z \qquad (VII),$$

where
B is the radical of the formula (I)
z is 0 or 1,
m is 0 or an integer from 1 to 2000 and
n is 0 or an integer from 1 to 20, with the proviso that on average at least one radical B is present per molecule.

7. A process for the preparation of the β-ketocarbonyl-functional organosilicon wax of claim 1, comprising reacting organosilicon compounds (1) having at least one radical A of the formula $$[HX-]_vL-(Si) \qquad (II)$$

with diketenes (2) of the formula

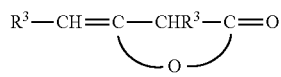
(III)

8. The process of claim 7, wherein organosilicon compounds (1), organopolysiloxanes of the formula $$A_gR_{3-g}SiO(SiR_2O)_l(SiRAO)_kSiR_{3-g}A_g \qquad (V),$$

are used,
where
A is a radical of the formula (II),
g is 0 or 1,
l is 0 or an integer from 1 to 2000 and
k is 0 or an integer from 1 to 20,
with the proviso that on average at least one radical A is present per molecule.

9. A process of claim 7, wherein a radical of the formula $$H_2N-CH_2CH_2CH_2-$$

is used as radical A.

10. A creamy wax formulation comprising
(a) at least one β-ketocarbonyl-functional organosilicon wax of claim 1, and
(b) linear, branched or cyclic organosilicon compounds with a viscosity of 0.65 to 100,000 mPa·s at 25° C.

11. A creamy wax formulation comprising
(a) at least one β-ketocarbonyl-functional organosilicon wax prepared by the process of claim 7, and
(b) linear, branched or cyclic organosilicon compounds with a viscosity of 0.65 to 100,000 mPa·s at 25° C.

12. A creamy wax formulation comprising
(a) at least one β-ketocarbonyl-functional organosilicon wax of claim 1, and
(b) linear, branched or cyclic organosilicon compounds with a viscosity of 0.65 to 500 mPa·s at 25° C.

13. A creamy wax formulation comprising
(a) at least one β-ketocarbonyl-functional organosilicon wax of claim 7, and
(b) linear, branched or cyclic organosilicon compounds with a viscosity of 0.65 to 500 mPa·s at 25° C.

* * * * *